Dec. 15, 1964     L. PERLAKY     3,161,456
MULTIPLE CHANNEL CHART RECORDER
Filed April 1, 1963     2 Sheets-Sheet 1
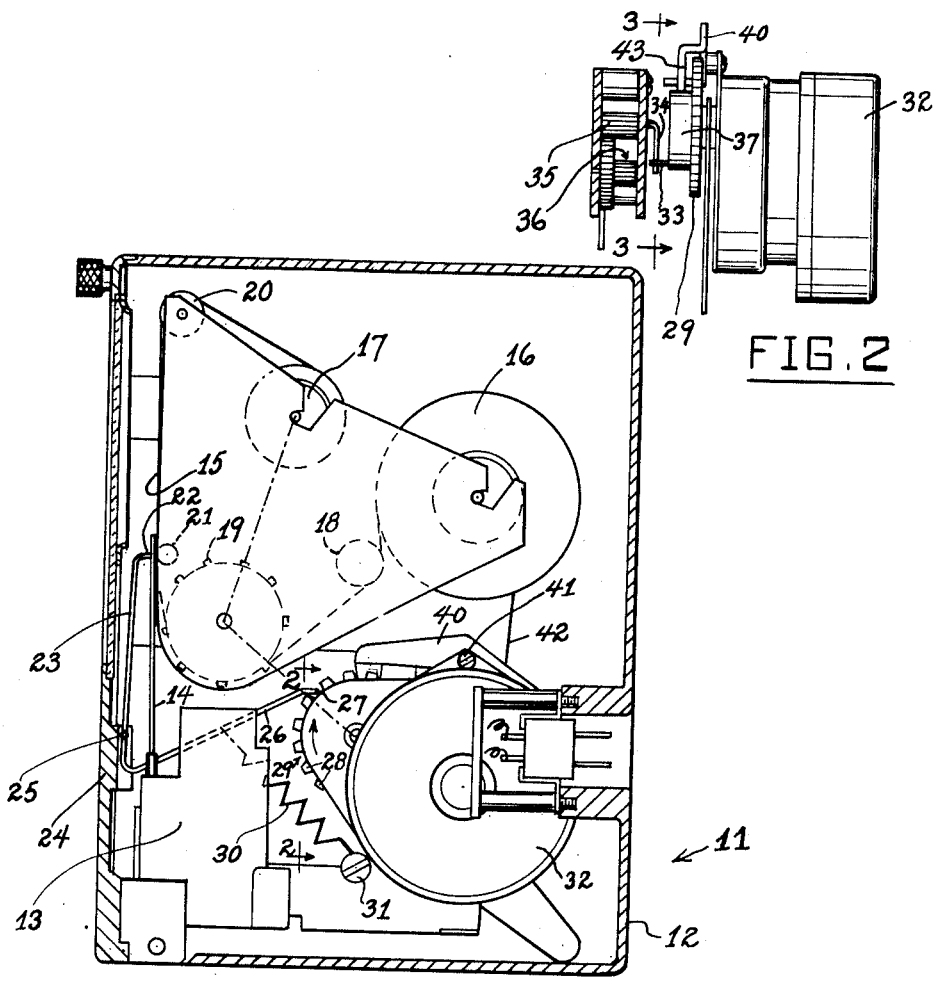
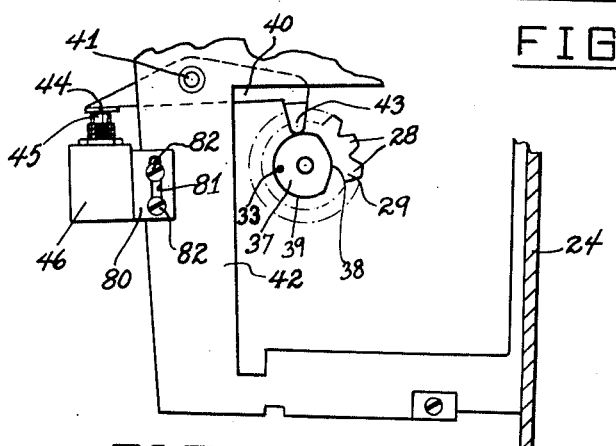
INVENTOR.
LEOPOLD PERLAKY
BY Herman L. Gordon
ATTORNEY Dec. 15, 1964   L. PERLAKY   3,161,456
MULTIPLE CHANNEL CHART RECORDER
Filed April 1, 1963   2 Sheets-Sheet 2
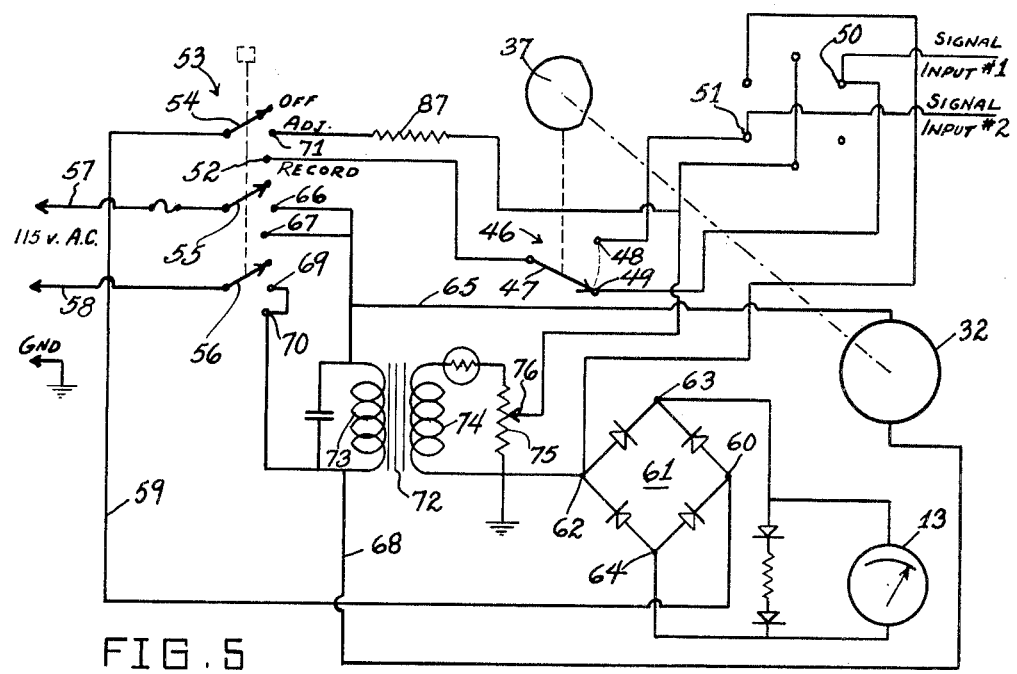
FIG. 5
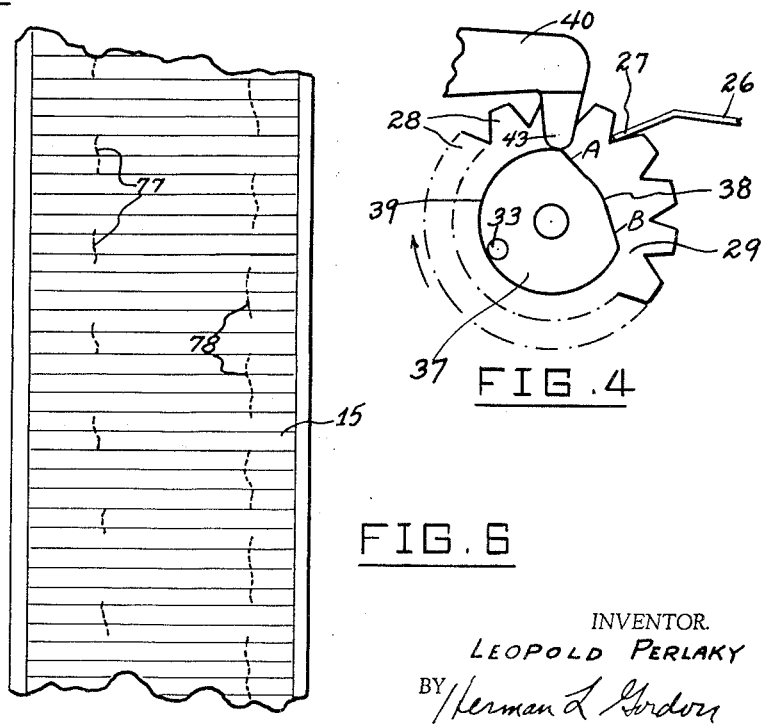
FIG. 6
FIG. 4
INVENTOR.
LEOPOLD PERLAKY
BY Herman L. Gordon
ATTORNEY United States Patent Office 3,161,456
Patented Dec. 15, 1964

3,161,456
MULTIPLE CHANNEL CHART RECORDER
Leopold Perlaky, Washington, D.C., assignor to Hygrodynamics, Inc., Silver Spring, Md.
Filed Apr. 1, 1963, Ser. No. 269,301
7 Claims. (Cl. 346—50)

This invention relates to chart recording apparatus of the type wherein a strip or roll of paper is inscribed with metered information by a succession of pressures thereon, and more particularly to a chart recording apparatus employing pressure sensitive paper and having means to apply a succession of pressure impulses to said paper in accordance with the indications of a meter pointer.

A main object of the invention is to provide a novel and improved chart recording apparatus of the above type wherein the apparatus is arranged to register a plurality of different signal indications on the same chart, said signal indications corresponding to respective meter readings provided by different input signals varying with time.

A further object of the invention is to provide an improved chart recording apparatus arranged to simultaneously provide records of two different signals varying with time and ordinarily of substantially different strengths, employing only a single signal-responsive meter device, the apparatus having time-division means whereby recording indications on a common moving chart are made alternately for the two signals and in a manner enabling the resultant traces to be readily distinguished from each other, so that the respective recorded signal traces may be easily identified.

A still further object of the invention is to provide an improved multi-channel recorder employing a common signal-responsive meter element, with means to provide alternate periodic switching of a pair of variable input signals to the meter element, and employing means to transfer the respective indications of the meter element to a moving chart in a manner to provide two distinctive traces corresponding to the variable input signals, the apparatus providing one trace which has relatively short, regularly spaced blank intervals and another trace which comprises markings made in the time periods corresponding to the blank intervals of the first-mentioned trace, whereby the two traces are distinctively different in appearance and whereby the same meter element is efficiently utilized for continuously measuring or monitoring the two variable input signals.

A still further object of the invention is to provide an improved multi-channel recorder of the type wherein the recording traces are produced by a succession of pressure impulses on moving pressure-sensitive paper, said impulses being produced by the oscillation of a pivoted striker plate actuated by a toothed cam driven synchronously with the paper, the recorder including signal-responsive meter means and means for switching the signal input thereto during periods between pressure impulses, said periods being of sufficient duration to allow said meter means to respond independently to different input signals, whereby recorded traces are provided on the paper corresponding to the responses of said meter means to the different input signals.

Further objects and advantages of the invention will become apparent from the following description and claims, and from the accompanying drawings, wherein:

FIGURE 1 is a vertical cross-sectional view taken through a two-channel recorder constructed in accordance with the present invention.

FIGURE 2 is a fragmentary cross-sectional view taken substantially on the line 2—2 of FIGURE 1.

FIGURE 3 is a fragmentary cross-sectional view taken substantially on the line 3—3 of FIGURE 2.

FIGURE 4 is an enlarged fragmentary elevational detail view of the toothed striker plate oscillating cam and switching cam employed in the recorder of FIGURES 1 to 3 and showing the relative positions of the striker plate and switch lever while the signal inputs to the apparatus are being switched.

FIGURE 5 is a wiring diagram showing the electrical connections of the two-channel recorder of FIGURES 1 to 4.

FIGURE 6 is an elevational view of a fragmentary portion of a typical chart strip from the apparatus of FIGURES 1 to 5 having a pair of traces recorded thereon.

Strip chart recorders of the type wherein a recorded line is produced on pressure-sensitive paper by means of impulses of force applied by a striker plate to the semi-flexible pointer of a galvanometer are in themselves well known. For example, a recorder of this type is disclosed in U.S. Patent No. 3,048,848, to Richard W. May. In recorders of this type the striker plate intermittently presses the pointer against the paper, the pressure impulses occurring at fixed intervals. The striker plate is operated by a toothed cam or gear driven by a timing motor, which also drives the strip chart at a fixed speed.

Thus, in FIGURE 1, 11 generally designates a strip chart recorder comprising a housing 12 in which is mounted a galvanometer 13 having an upstanding semi-flexible pointer 14 movable across a strip chart 15, said strip chart being fed from a supply roll 16 and being wound up on a driven rewind roll 17. The strip chart is guided around a transverse guide rod 18, is positively engaged by sprocket teeth on a power-driven timing roller 19, and passes over a top guide roller 20. A cylindrical roll element 21 is provided, serving as a bearing against which the strip chart is pressed when the pressure impulses are applied to the semi-flexible pointer 14 by the turned edge 22 of the striker plate 23. Said striker plate is of generally V-shaped configuration and is pivoted to the front wall 24 of the recorder housing at 25. The striker plate has the bottom arm 26 having an inclined free edge portion 27 engageable with the teeth 28 of the driving cam 29. Striker plate 23 is biased clockwise, as viewed in FIGURE 1, by a coiled spring 30 connecting the arm 26 to a fixed anchor pin 31. The timing motor, shown at 32, rotates the cam 29 in a clockwise direction, as viewed in FIGURE 1, whereby the teeth 28 intermittently rock the striker plate, causing the pointer 14 to be intermittently pressed against the pressure-sensitive paper strip 15. The paper strip is continuously moved synchronously with cam 29 by a driving connection including a drive pin 33, a driven arm 34, a pinion gear 35, and a gear train 36 intercoupling the pinion gear 35, the sprocket roller 19, and the take-up roll 17.

The structure thus far described is conventional and is shown and described in detail in the above-mentioned U.S. Patent No. 3,048,848. However, the device disclosed in said prior patent provides only single-channel recording, namely, the recording of the deflections of the pointer 14 responsive to a single varying input signal applied to the galvanometer 13.

The present invention is based on the fact that there is a fixed time between strikes of the striker plate 23, during which the pointer 14 can be moved to a different part of the strip chart without leaving any trace during its movement. In accordance with the present invention, a switching system is provided which switches the input to the galvanometer to apply thereto at least one additional signal in synchronism with the striking or percussive action, whereby to produce another trace on the strip chart, showing the variation of another quantity independently of the first signal, on the same time base.

There is also provided a means of clearly distinguishing the two traces from each other.

In the typical example illustrated in the drawings, the driving cam 29 has 15 teeth or lobes 28, whereby the striker plate 23 is rocked 15 times during each revolution of the driving cam, thereby making 15 marks on the chart paper 15, which moves synchronously with the rotation of the cam. In the conventional single-channel recorder, the marks form a substantially continuous line due to the longitudinal movement of the paper. However, in the two-channel recorder of the present invention, illustrated in the drawings, a specially shaped switching cam 37 is mounted on the same shaft as the toothed cam 29, rigidly fixed relative thereto, thereby assuring synchronism of the two cams. The switching cam 37 is shaped so that approximately 25 percent of the cam surface, shown at 38, has a smaller radius than the remaining 75 percent, shown at 39, which is circular in contour. A cam follower arm 40 is pivoted at 41 to the stationary supporting frame 42 of the instrument assembly, said follower arm being provided at one end with a depending rounded follower lug 43 which engages the peripheral surface of cam 37. The opposite end of follower arm 40 is provided with a lug 44 which engages the outwardly biased operating plunger 45 of a single-pole, doublethrow microswitch 46 adjustably mounted on frame 42, as shown in FIGURE 3.

The switching cam 37 is angularly oriented in relation to the striker cam 29 so that the transition portions A and B on the periphery of cam 37 are engaged by the lug 43 exactly when the striker arm portion 26 is being lifted and when the pointer 14 of the galvanometer 13 is free to swing as cam 29 rotates.

Responsive to the engagement of lug 43 with cam portion A, the follower arm 40 is allowed to swing clockwise, as viewed in FIGURE 3 by the operating plunger 45, whereby the pole 47 of the microswitch is allowed to engage the stationary contact 48 thereof, toward which it is biased by conventional spring means in the microswitch. Pole 47 remains in engagement with contact 48 until cam portion B engages lug 43, whereupon the arm 40 is rotated counterclockwise, depressing the plunger 45 and causing the switch pole 47 to disengage from contact 48 and move into engagement with the other stationary contact 49 of the microswitch.

As shown in FIGURE 5, a first signal input terminal 50 is connected to switch contact 49 and a second signal input terminal 51 is connected to switch contact 48. The pole 47 is connected to the "record" terminal 52 of a manually operated three-pole, three-position function switch 53, which also controls the operation of the timing motor 32. Thus, the switch 53 has the three poles 54, 55 and 56. The poles 55 and 56 are connected to the respective alternating current supply conductors 57 and 58. Pole 54 is connected by a wire 59 to one input terminal 60 of a full-wave meter rectifier 61. The other input terminal 62 of the rectifier is connected to ground. The terminals of the galvanometer 13 are connected in a conventional manner to the output terminals 63 and 64 of the rectifier.

One terminal of motor 32 is connected by a wire 65 to the two lower switch contacts 66 and 67 associated with switch pole 55, and the other terminal of motor 32 is connected by a wire 68 to the two lower switch contacts 69 and 70 associated with switch pole 56.

An "adjust" contact 71 is associated with the switch pole 54, engaged thereby in the intermediate position of switch 53. Motor 32 is energized when switch 53 is either in its "adjust," or intermediate position, or in its "record," or lower position, as viewed in FIGURE 5.

An adjusting signal is provided by a transformer 72 whose primary 73 is connected across wires 65 and 68 and whose secondary 74 has the winding of a potentiometer 75 connected thereacross. The adjustable contact 76 of said potentiometer is connected through a resistor 87 to the "adjust" contact 71 of switch 53. With switch 53 in its "adjust" position, a calibrating signal is delivered to meter 13 from the secondary of transformer 72.

With the switch 53 in its "record" position, respective input signals ordinarily of substantially different strengths from input terminals 50 and 51 are alternately delivered to meter 13 by the action of cam 37 and microswitch 46 as above described. Due to the shape of cam 37, during each cycle of rotation of cams 29 and 37 the galvanometer is connected to the input terminal 51, responding to one measured quantity, for four strikes of the striker plate, and then to the input terminal 50, responding to the second measured quantity, for eleven strikes of the striker plate. Thus, the first measured quantity will produce a series of spaced relatively short traces 77 on the chart strip 15 each comprising four impression and the second measured quantity will produce a series of relatively long traces 78 on the strip, each comprising eleven impression, as shown in FIGURE 6. Thus, one line appearing on the paper will be more dense than the other, thereby providing means for distinctively identifying the two traces. In most cases, depending on the chart speed, the line comprising the successive eleven-dot segments will show up as a substantially continuous line, whereas the trace comprising the successive four-dot segments will show up as a dotted line.

Exact synchronization is assured by providing means for adjusting the position of microswitch 46. Thus, the microswitch is provided with a supporting flange 80 formed with a slot 81 extending parallel with plunger 45, and the microswitch is adjustably secured to frame 42 by a pair of clamping screws 82, 82 engaged through slot 81, as shown in FIGURE 3. By shifting the position of the microswitch, the point of switching in relation to the angular position of cam 37 may be adjusted.

While a specific embodiment of a multiple-channel recorder has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In a recorder including a meter having a pointer, a movable record strip adjacent said pointer, a pivoted striker plate engageable with said pointer to press the pointer against the record strip, and a rotary toothed cam engageable with the striker plate to intermittently rock the striker plate and cause it to apply a plurality of marking impulses on said pointer, providing a series of multiple individual impressions for each cycle of rotation of the cam, signal input means, switch means, circuit means connecting said signal input means to said meter through said switch means, switching cam means driven simultaneously with said rotary toothed cam, and follower means operatively coupled with said switch means and engaging said switching cam means, said switching cam means being contoured to cause operation of said switch means at predetermined portions during the cycle of rotation of said toothed cam coinciding with intervals between individual marking impulses.

2. In a recorder including a meter having a pointer, a movable pressure-sensitive record strip adjacent said pointer, a pivoted striker plate engageable with said pointer to press the pointer against the record strip, and a rotary toothed cam engageable with the striker plate to intermittently rock the striker plate and to cause it to apply a plurality of pressure impulses on said pointer, providing a series of multiple individual impressions for each cycle of rotation of the cam, a pair of signal input terminals, a two-position selector switch, circuit means connecting said input terminals to said meter through said selector switch, said switch connecting one signal input terminal to the meter in one position of the switch and connecting the other signal input terminal to the meter in the other position of the switch, switching cam means driven simultaneously with said rotary toothed cam, and follower means operatively coupled with said switch and engaging said switching cam means, said switching cam means being contoured to cause operation of the switch to said one position at one predetermined point during the cycle of rotation of said toothed cam and to cause operation of the switch to said other position at another predetermined point during said cycle of rotation, said points coinciding with intervals between individual pressure impulses.

3. The structure of claim 2, and wherein said predetermined points are angularly spaced by less than 180°, whereby the multiple-impression traces on the record strip produced by respective signals applied to said input terminals will comprise segments respectively having different numbers of individual impressions.

4. The structure of claim 2, and wherein said predetermined points are angularly spaced by substantially less than 180°, whereby the multiple-impression traces on the record strip produced by respective signals applied to said input terminals will consist of a first trace comprising relatively closely spaced segments having a relatively large number of individual impressions and a second trace comprising relatively widely spaced segments having a relatively small number of individual impressions.

5. The structure of claim 2, and wherein said switching cam means comprises a switching cam rigid and coaxial with said toothed cam and having a circularly curved main peripheral portion extending for an angle of substantially greater than 180° and an auxiliary circularly curved peripheral portion of different radius than said main peripheral portion, said predetermined points comprising respective transitional peripheral portions connecting the main peripheral portion to the auxiliary peripheral portion.

6. The structure of claim 5, and wherein said follower means comprises a pivoted arm having one end engaging the periphery of the switching cam and its other end in operative engagement with said selector switch.

7. The structure of claim 2, and wherein said predetermined points are spaced by an angle including a relatively small percentage of the total number of teeth on the toothed cam.

References Cited in the file of this patent
UNITED STATES PATENTS

| | | |
|---|---|---|
| 2,118,081 | Grisdale | May 24, 1938 |
| 2,125,345 | Hunt | Aug. 2, 1938 |
| 2,392,916 | Gruss | Jan. 15, 1946 |
| 2,414,221 | Bristol | Jan. 14, 1947 |
| 2,425,080 | Blakeslee | Aug. 5, 1947 |
| 2,445,272 | Keegan | July 13, 1948 |
| 2,674,513 | Bowditch et al. | Apr. 6, 1954 |
| 2,743,986 | Bradner | May 1, 1956 |
| 2,993,741 | Maltby et al. | July 25, 1961 |
| 3,048,848 | May | Aug. 7, 1962 |